United States Patent [19]

Cullen et al.

[11] Patent Number: 5,779,609
[45] Date of Patent: Jul. 14, 1998

[54] INTEGRATED STUD WELDING ROBOTIC TOOL CHANGING SYSTEM

[75] Inventors: W. Paul Cullen, Scotia; Pamela B. Billings, Ballston Spa; Douglas N. Gallup, Schoharie, all of N.Y.

[73] Assignee: Applied Robotics, Inc., Glenville, N.Y.

[21] Appl. No.: 587,367

[22] Filed: Jan. 16, 1996

[51] Int. Cl.[6] .................. B23Q 3/155; B23K 9/20
[52] U.S. Cl. .............. 483/69; 219/98; 483/901; 901/42
[58] Field of Search ............... 483/901, 16, 13, 483/27, 19, 69; 219/98, 86.25, 136; 901/42, 41; 285/317; 414/729; 227/58, 69, 70; 29/243.54

[56] References Cited

U.S. PATENT DOCUMENTS

| | | | |
|---|---|---|---|
| 3,309,495 | 3/1967 | Shoup et al. | 219/98 |
| 3,653,693 | 4/1972 | Wieland et al. | 285/317 |
| 4,454,775 | 6/1984 | Cullen et al. | 483/546 |
| 4,469,928 | 9/1984 | Wilkinson et al. | 219/98 |
| 4,620,079 | 10/1986 | Allmann | 219/98 |
| 4,620,656 | 11/1986 | McClay | 227/51 X |
| 4,635,328 | 1/1987 | Palmer | 901/42 X |
| 4,664,588 | 5/1987 | Newell et al. | 414/730 |
| 4,716,647 | 1/1988 | Winkler et al. | 483/47 |
| 4,763,401 | 8/1988 | Marinoni et al. | 483/10 |
| 4,792,655 | 12/1988 | Ettinger | 219/98 |
| 4,869,136 | 9/1989 | Easter et al. | 414/729 |
| 5,104,024 | 4/1992 | Brewer et al. | 29/243.54 |
| 5,384,445 | 1/1995 | Nakagami | 219/98 |
| 5,460,536 | 10/1995 | Cullen | 439/289 |
| 5,512,726 | 4/1996 | Arantes et al. | 901/42 X |

FOREIGN PATENT DOCUMENTS 0 216 261  9/1986  European Pat. Off. .

*Primary Examiner*—William R. Briggs
*Attorney, Agent, or Firm*—Heslin & Rothenberg, P.C.

[57] ABSTRACT

An apparatus for transporting a plurality of fasteners in an automated changing system, i.e., in a robotic tool changing system, wherein the system includes a tooling adaptor assembly adapted to be coupled and decoupled to and from a robot adaptor assembly. The transport apparatus includes a first member which has a first passage formed therethrough and a second member which has a second passage formed therethrough. Both the first and second members are mutually adapted for alignment to one another when the adaptor assemblies are coupled. When the adaptor assemblies are coupled together, the first and second members form an interface fitting so that the plurality of fasteners, i.e., studs, may pass therethrough, and ultimately be transported to a tool, i.e., a stud welding gun.

3 Claims, 3 Drawing Sheets

INTEGRATED STUD WELDING ROBOTIC TOOL CHANGING SYSTEM

BACKGROUND

1. Technical Field

The present invention generally relates to automated changing systems. More particularly, the present invention relates to robotic tool changing systems for stud welding applications.

2. Background Information

Over the past several decades, reliance on robot technology has increased significantly. While at one time the highest concentration of robot use was in the area of electronic machinery manufacturing and automobile manufacturing, the application of robot technology has spread to other diverse areas such as nuclear power generation, offshore development, disaster prevention and to areas where remote-controlled robot systems perform their functions quickly and accurately under difficult and dangerous conditions. Specifically, robots are now used to perform many diverse functions, such as finishing concrete, painting tall buildings and even performing medical care. The economic and social role of robots is likely to continue to expand in the future, as advancements in robot technology generate wider commercial application and provide improvements in industrial productivity and product quality.

One robotic development which has fueled the expansion and utilization of industrial robots are robotic tool changing systems which are designed to facilitate the performance of various different tasks by a single robotic system. For instance, a robotic tool changing system may enable a single robot to perform stud and spot welding, to palletize heavy loads and to engage in metal removal operations. The robotic tool changing system allows for the automatic exchange of tools necessary to perform these varied tasks. Typically, a robotic tool changing system is made up of two primary assemblies, a robot adaptor assembly and a tooling adaptor assembly. The robot adaptor assembly is attached to the robot while the tooling adaptor assembly is attached to the tool. When the adaptor assemblies are coupled together, the assemblies form the mechanical connection and signal interface (electrical, pneumatic, etc.), which permits the robot to perform a particular task.

Notwithstanding the expansion of robot technology to other fields, robot technology remains significant in industrial applications, such as in automotive manufacturing. For instance, robots continue to play a major role in automotive stud welding. In robotic stud welding applications, a stud welding gun is attached to a robot which is programmed to position the gun to the desired weld location and to automatically produce stud welds, without the need for an operator.

In a conventional automated stud welding system, system resource utility lines or cables are typically fed directly into the stud welding gun. For example, a stud feed tube, i.e., a hollow utility line or cable, may be fed directly into a stud welding gun to transfer a plurality of studs from a remote stud feeder to the stud welding gun. The remote stud feeder may provide air pressure to transport the studs through the feed tube. As the stud welding gun receives the flow of studs, the stud welding operation may be continuously performed. Another utility line or cable may also be fed directly into the stud welding gun for providing the gun with a weld current. Usually, this cable will extend from a remote power source/controller, providing the necessary current and its duration. Other utility lines may also extend directly into the gun, e.g., pneumatic lines for operating the gun, air or liquid lines for cleaning the weld surface, etc.

Often, during the manufacturing process, it is necessary to exchange stud welding guns. For instance, system failure or periodic maintenance may result in the need to have the robot change the currently employed stud welding gun to a backup or secondary gun. In order to efficiently continue the manufacturing process without loss of production time, it is imperative that an automated method of changing from one stud welding gun to another exists. In order to provide such automation, conventional robotic stud welding systems typically include two stud welding guns for a single work cell. However, as described above, all utilities lines in the conventional system are attached directly to the stud welding guns. A problem associated with attaching all utility lines directly to the stud welding gun is limited changing capability and efficiency, thereby restricting improvements in robot productivity.

Thus, a need exists for a fully integrated robotic tool change system having all stud welding utilities interfaced through the tool changing assemblies. The structure of the present invention, i.e., a robotic system which incorporates all of the utilities directly into a single tool change system for use with stud welding, fulfills this need.

SUMMARY

Briefly, the present invention satisfies this need and overcomes the shortcomings of the prior art through the provision of an apparatus for an automated changing system for transporting fasteners to a tool. A first adaptor assembly has a first passage, wherein this first passage has a first opening at a first end thereof and a second opening at a second end thereof. A second adaptor assembly has a second passage, wherein the second passage has a first opening at a first end thereof and a second opening at a second end thereof. When the first and second adaptor assemblies are mated, the first and second passages are mutually alignable to allow a fastener, e.g., a stud, to be transported therethrough to a tool, e.g., a stud welding tool.

It is therefore a primary object of the present invention to provide a stud welding robotic changing system which integrates all stud welding utility lines through the robotic change system.

It is another object of the present invention to provide a stud welding robotic changing system which increases the life of the utility lines of the stud welding tools employed in the system.

It is yet another object of the present invention to provide a stud welding robotic changing system which requires less maintenance and repair over conventional robotic stud welding systems.

It is still another object of the present invention to provide an integrated stud welding robotic changing system which simplifies the programmed motion of the robot arm when switching between stud welding tools.

It is but another object of the present invention to provide a stud welding robotic changing system which permits the removal of the stud welding gun from the work cell without the need to manually disconnect the utility lines attached to the stud welding gun.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description taken in conjunction with the accompanying drawings, in which:

DESCRIPTION

Figure 1:
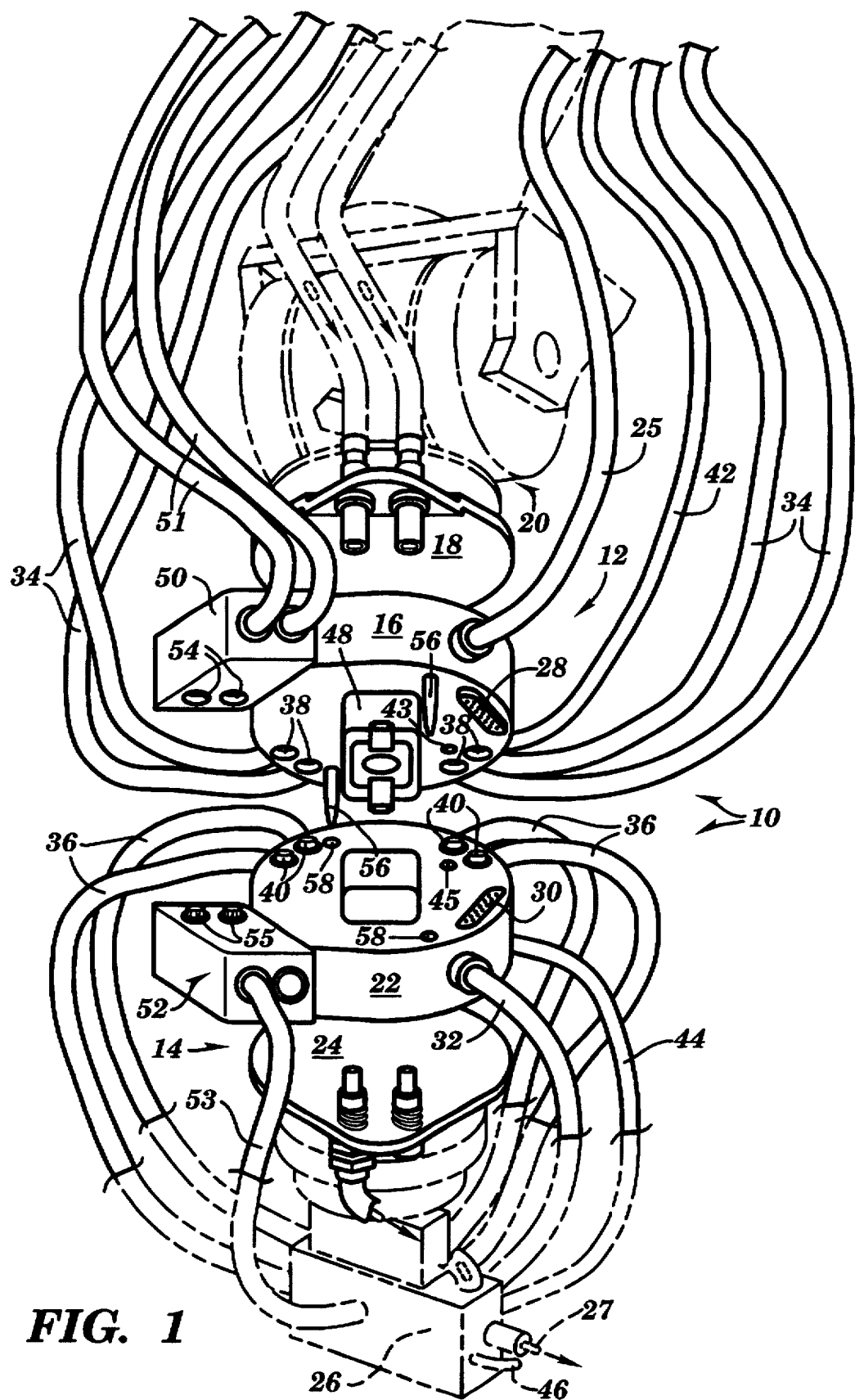
FIG. 1 is a three-dimensional, partially exploded view, of an automated robotic tool changing system, constructed in accordance with the principles of the present invention, and employed in conjunction with a stud welding gun.

It will be readily apparent that the components of the present invention, as generally described and illustrated in the drawings, can be arranged and designed in a wide variety of different configurations. Thus, the following description of the presently preferred embodiments of the integrated stud welding robotic tool changing system, as represented in FIGS. 1–5, is not intended to limit the scope of the invention, as claimed, but is merely representative of the presently preferred embodiments of the invention. The presently preferred embodiments of the invention will be best understood by reference to the drawings, where like parts are designated with like numerals.

In reference to the drawings, and more particularly to FIG. 1, there is shown in accordance with the principles of the present invention, one embodiment of an automated changing system, i.e., an integrated stud welding robotic tool changing system 10. Tool changing system 10 includes a first adaptor assembly, i.e., a robot adaptor assembly 12 and a complimentary, automatically couplable, second adaptor assembly, i.e., a tooling adaptor assembly 14. As shown in the exploded view of FIG. 1, robot adaptor assembly 12 is situated over tooling adaptor assembly 14, and both assemblies appear ready to be coupled together.

Robot adaptor assembly 12 may include a robot adaptor unit 16 and a robot adaptor plate 18. Robot adaptor unit 16 may be removably attached to robot adaptor plate 18 through conventional mechanical securing means, and a robot end of arm 20 may be mechanically secured to robot adaptor plate 18. Likewise, tooling adaptor assembly 14 may include a tooling adaptor unit 22 and a tooling adaptor plate 24. Tooling adaptor assembly 14 may be mechanically secured to a number of different tools, and in the preferred embodiment, to a stud welding gun 26.

As illustrated best in FIG. 1, various connectors and cables may extend from both robot adaptor unit 16 and tooling adaptor unit 22 so that various applications can be performed by the robotic system 10. Therefore, tool changing system 10 may incorporate electrical, pneumatic and other interface connections therein.

A first electrical cable 25, extending from a remote controller (not shown) and into robot adaptor unit 16, facilitates the transfer of input/output (I/O) control signals for the operation of tool changing system 10. During coupling of adaptor units 16 and 22, female electrical pin connector 28 of robot adaptor unit 16 mates with corresponding male electrical pin connector 30 of tooling adaptor unit 22 for electrical control signal transfer between the adaptor units. An associated second electrical cable 32 extends from tooling adaptor unit 22 and is connected to stud welding gun 26.

In order to operate stud welding gun 26, pneumatic lines 34 may extend from a remote source (not shown) into robot adaptor unit 16, and corresponding lines 36 may extend from adaptor unit 22 into gun 26. Female interface ports 38 on robot adaptor unit 16 correspond to male interface ports 40 on tooling adaptor unit 22 so that when adaptor units 16, 22 couple, a passageway provides for the flow of air from pneumatic lines 34, through robot adaptor unit 16 and tooling adaptor unit 22, and out corresponding pneumatic lines 36 of tooling adaptor unit 22 and into stud welding gun 26.

An air line 42 may extend into robot adaptor unit 16, and a corresponding line 44 may extend away from tooling adaptor unit 22 to provide a flow of air from a remote air source (not shown) to ultimately blow-off any debris or other waste which may accumulate on a weld surface. Port 43 on robot adaptor unit 16 corresponds to port 45 on tooling adaptor unit 22 for providing a passage for the air through the coupling assemblies. A tubular nozzle 46, extending away from the body of stud welding tool 26, provides the proper aim and direction of the air to clean and prepare the weld surface. Similarly, a fluid line (not shown) may be incorporated into the tool changing system 10 to provide a flow of a fluxing or anti-smut liquid for cleaning and preparing the weld surface.

A latching mechanism 48 may be employed in order to automatically couple and uncouple robot adaptor unit 16 to tooling adaptor unit 22. During operation, the engaged latching mechanism 48 provides a payload capacity exceeding the payload requirements of most robots. Pneumatic lines (not shown) provide a flow of air into robot adaptor assembly 12 to operate cylinders (not shown) incorporated therein and employed for securing latching mechanism 48 when coupling and uncoupling the adaptor units.

For greater detail on the interconnections and operation of a robotic tool changing system, the reader is referred to U.S. Pat. No. 4,664,588, issued to Newell et al., commonly owned by the assignee of the present invention, Applied Robotics, Inc., entitled APPARATUS AND METHOD FOR CONNECTING AND EXCHANGING REMOTE MANIPULABLE ELEMENTS TO A CENTRAL CONTROL SOURCE, the disclosure of which is hereby incorporated by reference in its entirety. Also, the reader is referred to the user's guide for the XChange™ XC-50™ robotic tool changer (user guide 90516R02), of Applied Robotics, Inc., 648 Saratoga Road, Glenville, N.Y. 12302, the disclosure of which is hereby incorporated by reference in its entirety. Currently, the XChange™ XC-50™ tool changer is preferred for use in the integrated stud welding robotic tool changing system of the present invention because of its payload capacities. However, it should be understood that the present invention is in no way limited to any particular model or type of robotic exchange equipment. Indeed, the present invention has been designed for incorporation into any automated changing systems for which it is desired to feed all utility lines, including lines for transporting fasteners, directly through automated tool changing assemblies.

Each adaptor assembly of tool changing system 10 may also include an electrical power module, i.e., a robot electrical power module 50 and a tooling electrical power module 52. As can be seen best in FIGS. 1 and 2, each module may be removably secured to a respective adaptor unit. Both modules are configured for matable union when a robot adaptor assembly 12 is coupled to tooling adaptor assembly 14. Once mated, sufficient electrical power to operate stud welding gun 26 may be transferred from a remote power source (not shown), through adaptor assemblies 12 and 14, and to gun 26. Preferably, two power cables 51 extend from one or more remote power sources (not shown) into robot electrical power module 50. Extending away from tooling electrical power module 52 and into stud welding tool 26 is a single electrical cable 53 which corresponds to one of the two power cable 51.

As shown in FIG. 1, in order to achieve the transfer of power between the adaptor assemblies, each electrical power module 50, 52 may include one or more high power electrical contacts 54, 55. In the preferred embodiment, each module includes two electrical contacts for accommodating two different power requirements. Therefore, two different types of welds, having different amperage requirements, can be performed by tool changing system 10. Each contact 54 on robot electrical module 50 is matable with a corresponding contact 55 on tooling electrical module 52 so that electrical power can be transferred between the adaptor assemblies 16 and 22.

It is preferred that the contacts employed in each electrical power module 50, 52 are the replaceable high power electrical contacts which are described in U.S. Pat. No. 5,460,536, issued to Cullen, commonly owned by the assignee of the present invention, Applied Robotics Inc., and entitled REPLACEABLE HIGH POWER ELECTRICAL CONTACTS FOR ROBOTIC TOOL CHANGING SYSTEMS, the disclosure of which is incorporated by reference in its entirety. By using a common hand tool, the replaceable high power contacts provided may be simply and easily replaced without the difficulty of disassembly and re-assembly of the electrical power modules which house the contacts, thereby improving efficiency and productivity in robotic applications.

In order to facilitate coupling of robotic adaptor unit 16 and tooling adaptor unit 22, a plurality of bullet-nosed pins 56 may extend from robot adaptor unit 16 for alignment and insertion into corresponding alignment holes 58 in tooling adaptor unit 22.

Figure 2:
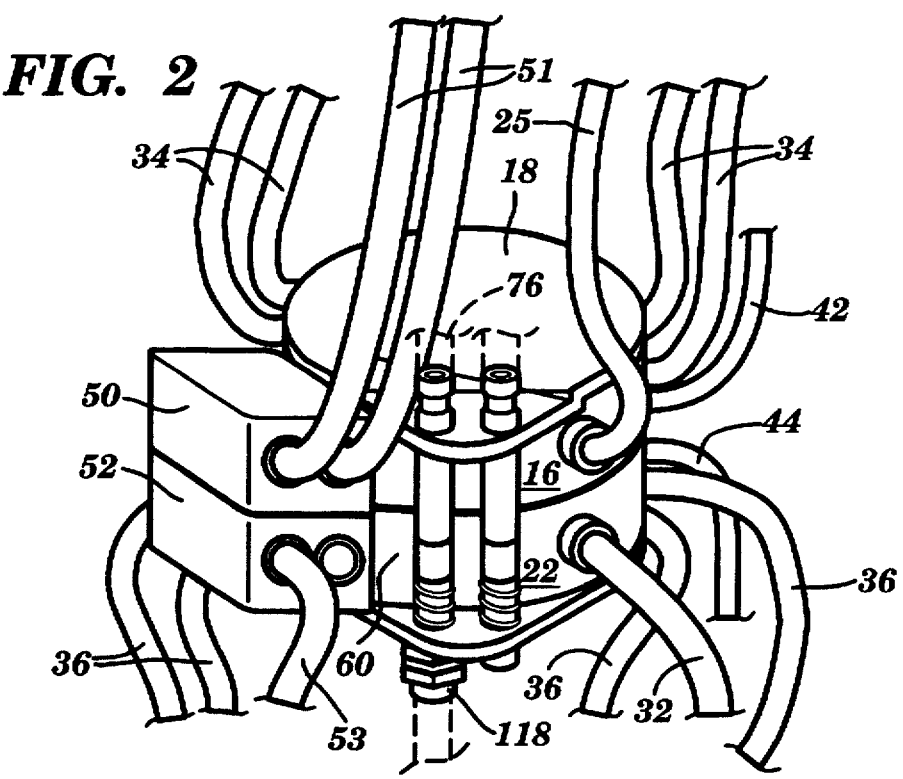
FIG. 2 is an isometric view showing the automated tool changing adaptor assemblies of FIG. 1, i.e., a robot adaptor assembly and a tooling adaptor assembly, both coupled together, all constructed in accordance with the principles of the present invention.
Figure 3:
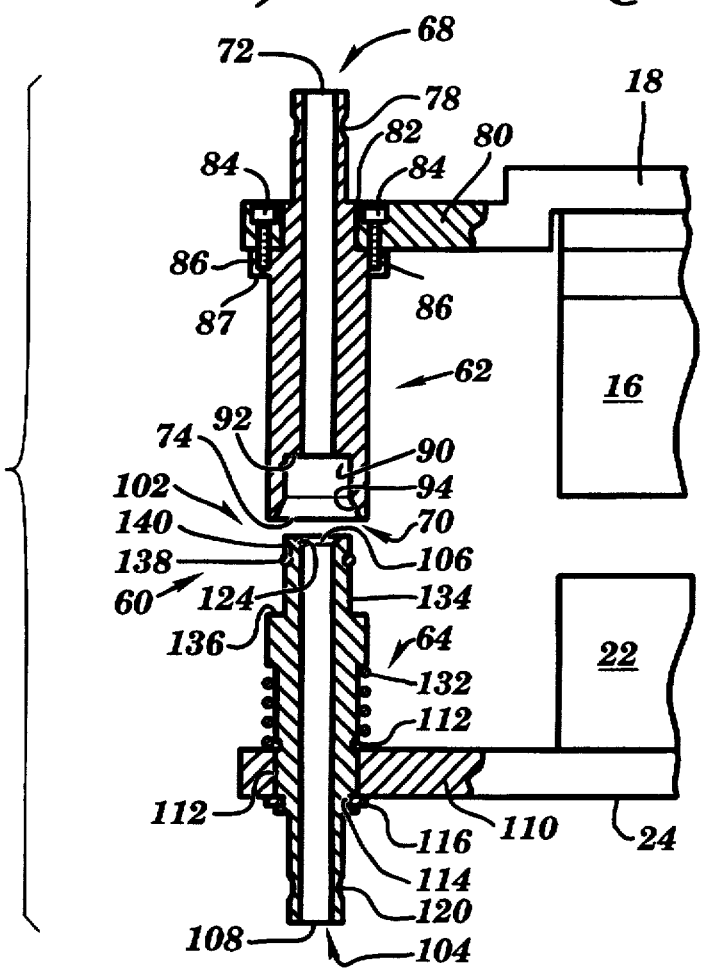
FIG. 3 is a partial cross-sectional and cutaway view of the adaptor assemblies shown in FIG. 2, but shown slightly separated, illustrating in detail the structure of one embodiment of an interface fitting for transporting fasteners, i.e., studs, through a robotic tool changing system.

As illustrated best in FIGS. 2 and 3, robot adaptor unit 16 and tooling adaptor unit 22 may be automatically coupled to one another. In coupling adaptor units together, a connector, i.e, an interface fitting 60 may be coupled so as to provide a conduit or passageway for the flow of fasteners, e.g., studs 27, from a remote stud feeder (not shown) to stud welding gun 26. In FIG. 1, studs 27 are illustrated at several different locations as they are transported through tool changing system 10. In the preferred embodiment (and as shown in FIGS. 1 and 2), robotic tool changing system 10 incorporates two interface fittings 60 so as to permit a flow of stud from two separate stud feeders. However, it should be noted that the present invention is in no way limited to two interface fittings 60. Under appropriate circumstances, it may be desirable to employ only a single interface fitting 60. On the other hand, depending upon the robotic application, it may be desirable to have more than two interface fittings 60. For example, it may be desirable to utilize three or four (or more) interface fittings, which could accommodate different sized studs. Such a robotic system could then have the ability to produce different types of stud welds within the robotic work cell.

As can best be seen in FIGS. 2 & 3, each interface fitting 60 may comprise two members, i.e., a first member 62 and a second member 64, both of which are attached to a respective adaptor assembly. In the preferred embodiment, first member 62 is attached to robot adaptor plate 18 of robot adaptor assembly 12 and second member 64 is attached to tooling adaptor plate 24 of tooling adaptor assembly 14.

First member 62 is preferably tubular in shape and has a first passage 66 extending axially therethrough from a first end 68 to a second end 70. A first opening 72, i.e., an entry port, is disposed at first end 68 and a second opening 74, i.e., an exit port, is disposed at second end 70.

First end 68 of first member 62 is preferably attached to a feed tube, e.g., a stud feed tube 76 (shown in FIG. 2). In order to facilitate attachment to stud feed tube 76, first end 68 may include means for attaching stud feed tube 76 thereto. Any known means of attachment may be employed to secure feed tube 76 to first end 68 of first member 62. In one embodiment, and as shown in FIG. 3, a circumferential groove 78 is formed around a periphery of first member 62 for facilitating attachment to a feed tube having a quick-disconnect type connector. However, any connecting means may be employed, so long as the means for connection provides a smooth transition for the transportation of studs from feed tube 76 into first member 62.

First member 62 is preferably secured to an extension member 80 of robot adaptor plate 18. In the preferred embodiment, an aperture 82 is formed in extension member 80 so that first member 62 may be received therein. Any known means of mechanical connection may be employed to secure first member 62 to extension member 80 of robot adaptor plate 18, including, for example, conventional set screws 84. In order to secure set screws 84 to extension member 80, associated threaded apertures 86 may be formed in first member 62. In order to accommodate the formation of threaded apertures 86 in first member 62, a portion of first member 62 preferably includes an enlarged diameter at 87.

First passage 66 extends from first opening 72 at first end 68 and terminates at second opening 74 at second end 70. Preferably, first passage 66 is circular in cross-section, defines an inner passage wall 88 which provides the conduit for the passage of studs therethrough. As first passage 66 extends from first opening 72 to second opening 74, the inner diameter preferably remains constant. However, in order to facilitate mating of first member 62 and second member 64 so as to provide a smooth transition for studs passing therebetween, a female connector configuration may be formed at second end 70. Therefore, inner passage wall 88 terminates at an inner ledge 92, where the inner diameter of first passage steps up to an inner connector wall 90. Inner connector wall 90 flares outward at 94 to provide a lead-in at second opening 74 for receiving second member 64.

Second member 64 is preferably tubular in shape and has a second passage 100 extending axially therethrough from a first end 102 to a second end 104. A first opening 106, i.e., an entry port, is disposed at first end 102 and a second opening 108, i.e., an exit port, is disposed at second end 104.

First and second members 62, 64 are mutually adapted to be aligned and mated for facilitating transport of studs 27 therethrough. In order to facilitate mating of first member 62 and second member 64, first end 102 of second member 64 may be formed in a male connector configuration for union with the female configuration formed at second end 70 of first member 62.

Second member 64 may be secured to an extension member 110 of tooling adaptor plate 24. An aperture 112 may be formed in extension member 110 of tooling adaptor plate 24 for receiving second member 64 therein. A ledge 112 may be formed around a periphery of second member 64 to prevent second member 64 from passing through aperture 112. Also, a circumferential groove 114 may be formed around a periphery of second member 64 for receiving a snap ring 116 therein to secure second member to extension member 110.

A spring, e.g., a conventional coil spring 130 may extend around second member 64 to provide a degree of play or compliancy when members 62 and 64 are coupled together. Coil spring 130 is positioned so that one of its ends is positioned to rest against a lip 132 formed around a periphery of second member 64 while its other end rests against extension member 110. Coil spring 130 is preferably integrated into tool changing system 10 of the present invention so as to compensate for collision or gravity changes which could cause adaptor assemblies 12 and 14 to separate. Thus, the incorporation of spring 130 minimizes any structural damage to interface fitting 60 which could occur if there was no compliancy provided. It should be noted that any other means for providing a degree of compliancy for interface fitting 60 may be employed in lieu of coil spring 60.

Second passage 100 extends from first opening 106 at first end 102 and terminates at second opening 108 at second end 104. Like first passage 66, second passage 100 is preferably circular in cross-section and defines an inner passage wall 122. As second passage 100 extends from first opening 102 to second opening 104, the inner diameter of inner passage wall 100 preferably remains constant and is the same as the inner diameter of inner passage wall 88 of first member 66. At first end 102, inner passage wall 122 may include a chamfered wall 124 to provide a smooth transition for the studs being transferred through interface fitting 60.

At first end 102 of second member 64, the outer periphery of second member 64 may be sized for slidable insertion in to inner connector wall 90 of first member 62. Therefore, the inner diameter of inner connector wall 90 and the outer diameter of first outer wall 134 should be configured for slidable union. A ledge 136 is formed at a selected location of the periphery of second member 64 to facilitate placement of the male connector configuration of second member 64 within the female connector configuration of first member 62.

A circumferential gap 138 is formed around a periphery of first outer wall 134 to accept an O-ring 140 therein. While studs are being passed through mated members 62 and 64, the air pressure associated with transporting studs through interface fitting 60 forces O-ring 140 to rest up against inner connector wall 90 of first member 62 to create a leak-free seal between members 62 and 64.

Second end 104 of second member 64 is preferably attached to a feed tube 118 which is fed into stud welding gun 26. In order to facilitate attachment to stud feed tube 118, second end 104 may include means for attaching stud feed tube 118 thereto. Any known means of attachment may be employed to secure feed tube 118 to second end 104 of second member 64. As shown in FIG. 3, a circumferential groove 120 may be formed around a periphery of second member 64 near second end 104 for facilitating attachment to a feed tube with a quick-disconnect type connector. However, any connecting means may be employed, so long as the means for connection provides a smooth transition for the transportation of studs from second member 64 into feed tube 118.

Figure 4:
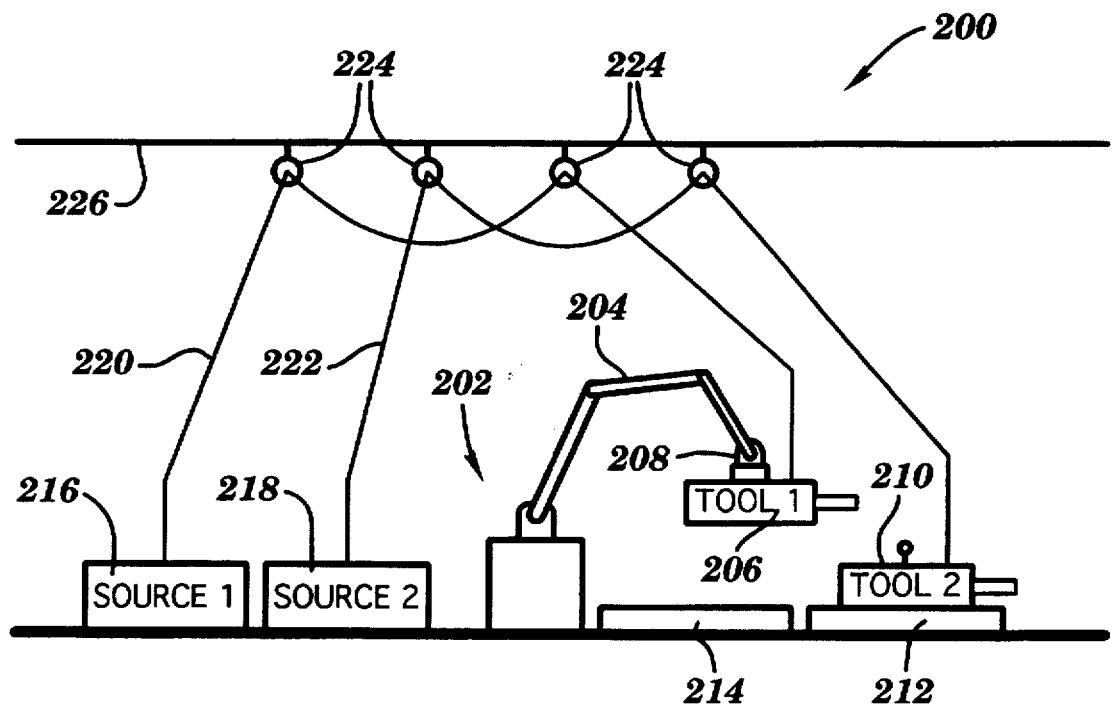
FIG. 4 is a system diagram illustrating a conventional robotic stud welding system which includes a primary stud welding gun and a secondary stud welding gun, each gun having a dedicated source for all required resources, wherein all the utility lines for the guns are tethered to the ceiling and attached directly to the respective guns.

In reference now to FIG. 4, there is shown a complete conventional robotic stud welding system 200. This conventional system includes a robot 202 having an arm 204 with various pivot points located therealong. A primary stud welding gun 206, labeled TOOL 1, is shown secured to the end of arm 208 of robot 202, while a secondary stud welding gun 210, labeled TOOL 2, is shown stationed on a fixture 212 for backup. An empty fixture 214 awaits placement of primary stud welding gun 206 thereon when the robot changes from primary gun 206 to secondary stud welding gun 210. A primary source 216, labeled SOURCE 1, represents the supply source for primary stud welding gun 206 and a secondary source 218, labelled SOURCE 2, provides the resources for secondary stud welding gun 210. While all of the resources appear to be derived from either primary source 216 (SOURCE 1) or secondary source 218 (SOURCE 2), it is likely that there will be separate physical components which provide the varied resources. For example, the stud feeding apparatus may be separate from the electrical power supply. All of the resources emanating from primary and secondary sources 216, 218 are represented by two lines, respectively, line 220 and line 222. However, in actuality, they would represent a bundle of lines or cables meshed together, like an umbilical cord.

All lines are tethered to hooks 224 depending from a ceiling 226 where the system is located and the utility lines are draped from various points on the ceiling. The draping and tethering of the umbilical cord-like mesh of lines results in wear on the lines. Furthermore, instead of attaching all utility lines of the system 200 directly into a robot adaptor assembly of a robotic tool changing system, like the system of the present invention, all utility lines or cables are fed directly into respective stud welding guns. Therefore, all utility cables emanating from primary source 216 (SOURCE 1) are directly attached to primary stud welding gun 206 (TOOL 1) and all utility cables emanating from secondary source 218 (SOURCE 2) are directed attached to secondary stud welding gun 210 (TOOL 2).

If for some reason, it is necessary to change from primary stud welding gun 206 to secondary stud welding gun 210, i.e., for maintenance or because of system failure, primary gun 206 may be placed on primary fixture 214, and the robot may thereafter grasp secondary stud welding gun 210. If it is necessary to remove primary stud welding gun 206 from the work cell, it will be necessary to have a worker manually remove all utility lines fed directly into primary tool 206. Upon return of primary stud welding gun 206 to the work cell for continued operation, all utilities lines emanating from line 220 need to be manually reconnected to primary stud welding gun 206.

Figure 5:
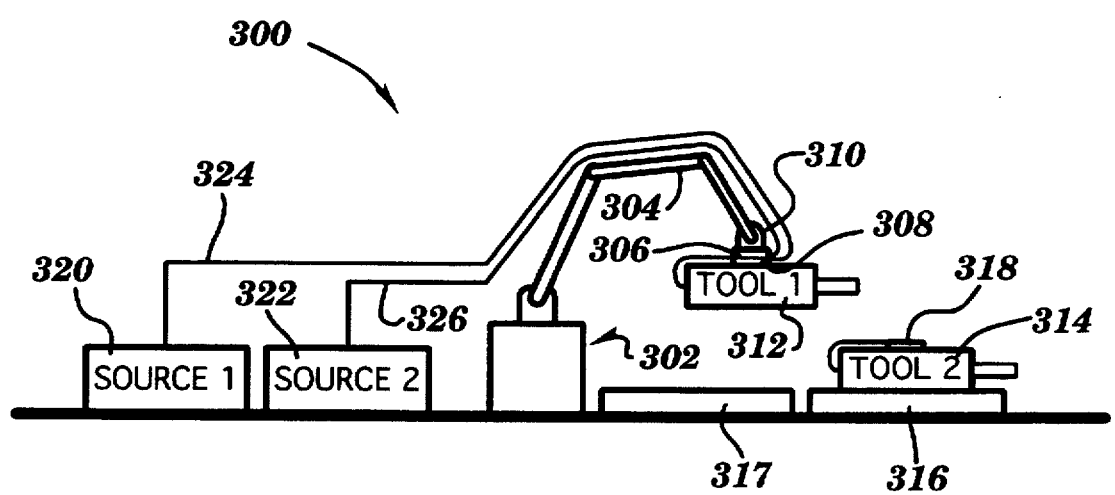
FIG. 5 is a system diagram illustrating the automated robotic tool changing system, constructed in accordance with the principles of the present invention, comprising a primary stud welding gun and a secondary stud welding gun, wherein the respective utility lines for the guns are fed directly into the automated robotic adaptor assembly of the automated robotic changing system.

FIG. 5 illustrates a complete robotic stud welding system 300 constructed in accordance with the principles of the present invention. This system includes a robot 302 having an arm 304 with various pivot points located therealong. A robotic tool changing system is incorporated into stud welding system 300, and therefore robot and tooling adaptor assemblies 306, 308 are coupled to one another, and robot adaptor assembly 306 is attached to the end of arm 310 of robot 302. A primary stud welding gun 312, labelled TOOL 1, is shown secured to the tooling adaptor assembly 308, while a secondary stud welding gun 314 is stationed on a fixture 316 as a backup unit for the stud welding system. An empty fixture 317 awaits placement of primary stud welding gun 312 thereon when the robot changes from primary gun 312 to secondary stud welding gun 314. Secondary stud welding gun 314 includes a tooling adaptor assembly 318 attached thereto to be coupled to robot adaptor assembly 306.

A primary source 320, labelled SOURCE 1, represents a source of supply for all desired resources for primary stud welding gun 312 (TOOL 1), including electrical power, pneumatic supply, control (I/O) and stud feed. A secondary source 322, labelled SOURCE 2, provides the resources for secondary stud welding gun 314 (TOOL 2). It should be noted that while in FIG. 4 all of the resources appear to be derived from a single central physical location, either primary source 320 (SOURCE 1) or secondary source 322 (SOURCE 2), it is likely that there will be separate physical components which provide the varied resources. For example, the stud feeding apparatus may be separate from the electrical power supply. However, it should also be noted that the present invention could utilize a single source of resources for primary gun 312 and secondary gun 314, thereby eliminating repetitive resource devices.

A first line 324, representing the transfer of all of the resources emanating from primary source 320 (SOURCE 1), extends away from primary source 320, up and along robot arm 304 and into robot adaptor assembly 306. Similarly, a second line 326, representing the transfer of all of the resources emanating from secondary source 322, extends away from secondary source 322, up and along robot arm 304, and into robot adaptor assembly 306. While all the resources emanating from primary and secondary sources 320, 322 are each represented as a single line in FIG. 5, in actuality, they would represent a bundle of lines or cables. Significantly, all of the utility lines extending from SOURCE 1 and SOURCE 2 for respective primary and secondary guns 312, 314 are joined directly to a single robot adaptor assembly 306. Because the utilities may extend from separate sources into a single robot adaptor assembly 306, it may be necessary to provide a junction connector or a manifold (both not shown) for passing some of the resources through the adaptor assemblies. However, in the preferred embodiment, this is not necessary for transporting studs because the preferred embodiment envisions two interface fittings for accommodating two stud feeders.

While several aspects of the present invention have been described and depicted herein, alternate aspects may be effected by those skilled in the art to accomplish the same objectives. For example, while in the preferred embodiment the subject invention is directed to transferring studs between adaptor assemblies, it is contemplated that the subject invention may be utilized for transferring other types of fasteners and solid items between automated robotic exchange units. Also, while in the preferred embodiment two interface fittings are contemplated, it should be understood that any number of interface fittings may be incorporated into the robotic tool changing system as described herein. Moreover, while two sources of resources are contemplated, any number of sources may be incorporated into the present invention, including, for example, a single source of resources. Accordingly, it is intended by the appended claims to cover all such alternative aspects as fall within the true spirit and scope of the invention.

What is claimed is:

1. In a robotic tool changing system which facilitates the automatic exchange of tools on an end of a robot arm, the combination comprising:

a robot adapter assembly for attachment to the end of the robot arm;

a tooling adapter assembly for attachment to a fastener attaching tool;

means for coupling said tooling adapter assembly to said robot adapter assembly;

a first passage defining member associated with said robot adapter assembly, said first passage defining member having an entry port at a first end thereof and an exit port at a second end thereof;

a second passage defining member associated with said tooling adapter assembly, said second passage defining member having an entry port at a first end thereof and an exit port at a second end thereof;

a first feed tube for transporting fasteners from a source of fasteners to said entry port of the first passage defining member;

a second feed tube for transporting fasteners from the exit port of said second passage defining member to the fastener attaching tool; and wherein the coupling of the tooling adapter assembly to the robot adapter assembly causes said first and second passage defining members to engage and define a passageway extending from said entry port of said first passage defining member to said exit port of said second passage defining member to allow a fastener to be transported from said source of fasteners through said first feed tube, said passageway and said second feed tube to the fastener attaching tool.

2. The combination of claim 1 wherein said first feed tube extends along the robot arm.

3. The combination of claim 1 wherein at least one of said first passage defining member and said second passage defining member is compliantly mounted.

* * * * *